United States Patent
Carringer et al.

(10) Patent No.: US 6,820,630 B2
(45) Date of Patent: Nov. 23, 2004

(54) SWIVELING INTAKE ELBOW FOR DRY SECTIONAL GATE VALVE

(75) Inventors: Rodney Alan Carringer, La Porte, IN (US); Ross J. Mack, Valparaiso, IN (US); Robert W. Steingass, Valparaiso, IN (US)

(73) Assignee: Task Force Tips, Inc., Valpaeaiso, IN (US)

( * ) Notice: Subject to any disclaimer, the term of this patent is extended or adjusted under 35 U.S.C. 154(b) by 0 days.

(21) Appl. No.: 10/409,996

(22) Filed: Apr. 9, 2003

(65) Prior Publication Data

US 2004/0200535 A1 Oct. 14, 2004

(51) Int. Cl.⁷ .............................. F16K 5/00; E03B 1/00
(52) U.S. Cl. ........................ 137/1; 137/615; 251/309; 285/179
(58) Field of Search .................. 137/1, 615, 556.3; 251/249.5, 309; 285/179, 181, 81, 82, 84, 91

(56) References Cited

U.S. PATENT DOCUMENTS

| | | | |
|---|---|---|---|
| 489,107 A | 1/1893 | Storz | |
| 4,848,398 A | 7/1989 | Leach | |
| 5,971,007 A | 10/1999 | Harcourt et al. | |
| 6,305,621 B1 | * 10/2001 | Kolacz et al. | 239/587.2 |
| 6,382,247 B1 | 5/2002 | Gundry | |
| 6,505,861 B2 | * 1/2003 | Butterfield et al. | 285/184 |

* cited by examiner

Primary Examiner—Kevin Lee
(74) Attorney, Agent, or Firm—Pearson & Pearson, LLP (57) ABSTRACT

A dry sectional gate valve having a swiveling intake elbow and shot pin assembly for selectively locking the elbow into a fixed position. A shot pin extends from a pull-knob through the flange of the elbow into one of a plurality of spaced-apart detent slots or holes around the perimeter of the valve body. The elbow can be swiveled thereby allowing a connecting fire hose to be positioned to minimize kinks and avoid obstacles thereby bringing water freely into the valve. The shot pin can be used to selectively lock the elbow in a desired position facilitating connection and disconnection of mating fire hose couplings or the shot pin can be set to allow the elbow to rotate freely enabling the hose to reach its most relaxed position when charged.

31 Claims, 7 Drawing Sheets

SWIVELING INTAKE ELBOW FOR DRY SECTIONAL GATE VALVE

BACKGROUND OF THE INVENTION

1. Field of the Invention

This invention relates generally to a sectional gate valve for use on a pumper fire truck, and in particular to a swiveling intake elbow of the sectional gate valve for easily connecting the swiveling intake elbow to a water source at various angles.

2. Description of Related Art

It is well known to attach a gated relief valve to a pumper fire truck in order to quickly attach a water supply hose to the valve. However, when the water supply hose is disconnected from the valve, water remains in the valve chamber resulting in corrosion of the valve parts over a period of time. However, U.S. Pat. No. 6,382,247, issued May 7, 2002 to David K. Gundry and assigned to Task Force Tips, Inc. of Valparaiso, Ind. describes a sectional gate valve comprising a bronze sectional gate positioned within the valve chamber adjacent to an outlet section of the valve having an outlet quick attachment coupler for connecting to a pumper fire truck and having an intake valve which connects to a hose. When the hose is disconnected from the valve and the valve is closed, there is no water remaining in the valve chamber.

U.S. Pat. No. 6,382,247 further describes attaching an elbow of the intake valve to the main housing of the valve with screws, which prevents the elbow from pointing in a desired direction which would minimize the possibility of kinks occurring in the hose line.

When a water supply for a pumper truck is located in front of or behind the truck, it is often not easy to connect the hose from the water supply to the intake valve on the pumper truck without kinks occurring in the hose. The intake valve typically has an inlet section comprising a straight section for connection to the hose or an elbow section which is fixed at a specific angle relative to the side of the pumper truck. A way to eliminate or minimize the formation of hose kinks and to make it easy and quick to connect the hose to the pumper truck is needed.

In U.S. Pat. No. 5,971,007, issued Oct. 26, 1999, to Robert Harcourt et al., a piston intake valve is described which is mounted on a fire truck and used to connect a fire plug via a hose to fill the storage chamber on the fire truck. The intake port of the valve connects to the hose and does not move to accommodate the angle that the hose arrives at the valve from the fire plug. Therefore, kinks in the hose line often occur.

In U.S. Pat. No. 4,848,398, issued Jul. 18, 1989 to Allen A. Leach and assigned to Jaffrey Fire Protection Company, Inc. A ball gate pressure relief valve is described having a gate in the form of a ball cock which rotates in horizontal plane on a vertical axis by means of a worm gear and wheel. If a hose is connected to the valve it may kink if not aligned directly with the valve. This is because bolts hold an inlet section to a main housing of the valve.

Valves such as piston valves, gate valves, dry sectional gate valves and other valves with an angle between inlet and outlet connections are referred to as angle valves. Both the valves of Harcourt and Leach have an angle between inlet and outlet connections. Their outlet coupling is connected to a fire pumper using fire hose threads. The outlet coupling rotates on the angle valve with bearing balls and tightens on the hose threads of the fire pumper to compress a rubber hose gasket which fixes the valve in a set position. The fixed position is desirable so that the hand wheel can be operated to control the flow of fluid without having the valve also rotate. Tightening the coupling is usually done with a large wrench, mallet, or other tool because of the large force required to compress the hose gasket in sealing relationship to the fire pumper and to insure the valve remains in its set position. Thus a tool is also required to loosen and then retighten the outlet connection in order to adjust the set position of the angle valve. It is undesirable to adjust the set position of these prior art angle valves at a fire to optimize the angle of the incoming fire hose given the urgency of rapidly bringing water to bear on a fire in an emergency. Consequently kinks are common which thereby reduce the maximum available flow of water to the fire. Some piston valves such as the Black Max® by Akron Brass® of Wooster, Ohio have down angles as great as 53 degrees increasing the undesired potential for hose kinks.

SUMMARY OF THE INVENTION

Accordingly, it is therefore an object of this invention to provide a swiveling intake elbow on a sectional gate intake valve for making easier connections to a hose at various angles.

It is another object of this invention to provide a connection of a hose to a pumper truck at various angles and minimize the formation of kinks in the hose line.

It is a further object of this invention to provide a plurality of spaced-apart holes around the perimeter of the intake elbow side of a dry sectional gate valve and to provide a shot pin assembly on a flange of a swiveling intake elbow whereby a shot pin of the shot pin assembly is inserted into one of the spaced-apart holes to lock the swiveling intake elbow in a fixed position.

These and other objects are further accomplished by a valve for conducting fluid between a fluid source and a fluid destination comprising a main housing, means, attached to an outlet section of the main housing, for connecting to the suction source, means, attached to an inlet section of the main housing, for connecting to the fluid source, the fluid source connecting means including a swiveling intake elbow, and means attached to the valve for securing the swiveling intake elbow in a fixed position. The means for securing the swiveling intake elbow in a fixed position comprises a shot pin engagable in at least one detent hole. The valve comprises means for urging the shot pin into engagement with at least one detent hole. The shot pin includes means for maintaining the shot pin out of engagement with the detent hole against the urgings of the urging means. The valve comprises means for controlling the flow of the fluid through the valve. The controlling means moves in response to a rotation of a handwheel. The controlling means comprises a sectional gate positioned adjacent to the outlet section of the main housing. The securing means further comprises a pin recess having a first larger cylindrical recess and a second cylindrical recess, a shot pin having a first cylindrical portion with a larger diameter than a second cylindrical portion, a coiled spring positioned on the second cylindrical portion of the shot pin, the shot pin and the coiled spring being inserted within the pin recess, a pull knob having a second step on an end for mating with a first step of the pin recess, and the second cylindrical portion of the shot pin extends within the pull knob, and means for securing the shot pin to the pull knob. The valve comprises means for relieving pressure within the valve.

The objects are further accomplished by a sectional gate valve comprising means, located on an outlet section of the valve, for attaching the valve to a suction source, means, located on an inlet section of the valve, for connecting the valve to a fluid source, the connecting means comprises a swiveling intake elbow, and a sectional gate, mounted inside the valve adjacent to the fluid destination connecting means, for controlling the flow of the fluid through the valve, the valve being dry when the valve is closed, connected to the fluid destination and not connected to the fluid source. The valve comprises means for securing the rotating connecting means in a fixed position. The means for securing the rotating connecting means comprises a shot pin for insertion into one of a plurality of spaced-apart holes around the inlet section of the valve.

The objects are further accomplished by a sectional gate valve comprising a main housing for providing a flow path for a fluid, an inlet section of the main housing comprises a swiveling intake elbow for attaching to a hose, an outlet section of the main housing comprises a coupling for attaching the sectional gate valve to a pumping source, a sectional gate mounted in the main housing adjacent to the outlet section for opening and closing the flow path, the main housing being dry when the sectional gate is closed, the outlet section is connected to the pumping source, and the inlet section is not connected to the hose, and means, coupled to the sectional gate and mounted on the main housing, for moving the sectional gate in response to a handwheel. The main housing comprises spaced-apart holes around the perimeter of the housing adjacent to the inlet section for receiving a shot pin from the swiveling intake elbow to secure the elbow into a fixed position. The swiveling intake valve comprises a pin recess having a first larger cylindrical recess and a second cylindrical recess, a shot pin having a first cylindrical portion with a larger diameter than a second cylindrical portion, a coiled spring positioned on the second cylindrical portion of the shot pin, the shot pin and the coiled spring being inserted within the pin housing, a pull knob having a second step on an end for mating with the first step of the pin housing, and the second cylindrical portion of the shot pin extends within the pull knob, and means for securing the shot pin to the pull knob.

The objects are further accomplished by an angle valve for conducting fluid between a fluid source and a fluid destination comprising a main housing, means, attached to an inlet section of the main housing, for connecting to the fluid source, means, attached to an outlet section of the main housing, for connecting to the fluid destination, means for swiveling the angle valve about the outlet section, and means for securing the swiveling angle valve in a fixed position without the use of a tool. The securing means comprises a shot pin engagable in at least one detent hole. The securing means comprises a friction locking means. The securing means is attached to the angle valve adjacent to the outlet section. The angle valve further comprises means for controlling the flow of the fluid through the valve, and the controlling means moves in response to a rotation of a hand wheel. The controlling means may also comprise a piston movable between an open and a closed position. The controlling means further comprises a gate slidable between an open and a closed position.

The objects are further accomplished by a method of providing a valve to enable attachment to a hose at various angles comprising the steps of providing an outlet section on the valve for connecting the valve to a suction source, controlling the flow of fluid through the valve with a movable element mounted inside the valve, and connecting a swiveling intake elbow to an inlet side of the valve, the swiveling intake elbow rotates 360 degrees for ease of attaching or disconnecting the hose, and securing the swiveling intake elbow to a fixed position when desired. The method comprises the step of providing at least one securing means around a perimeter of the inlet side of the valve adjacent to the swiveling intake elbow. The method comprises the step of providing a shot pin assembly on the swiveling intake elbow for securing the swiveling intake elbow into the fixed position when a shot pin of the shot pin assembly is inserted into one of the securing means. The method comprises the step of providing at least one securing means around a perimeter of the swiveling intake elbow adjacent to the inlet side of the valve.

The objects are further accomplished by a method of providing an angle valve to enable attachment to a hose at various angles comprising the steps of providing an angled inlet on the angle valve for connecting the valve to a fluid source, controlling a flow of fluid through the angle valve with a movable element mounted inside the angle valve, connecting an outlet section to an outlet side of the angle valve, the angle valve swiveling about the outlet section by at least 45 degrees rotation permitting positioning of the hose to a desired angle, and securing the angle valve to a fixed position when desired without the use of a tool. The method comprises the step of providing at least one securing means around a perimeter of the outlet section of the angle valve adjacent to the outlet side. The method comprises the step of providing a shot pin assembly on the swiveling angle valve for securing the swiveling angle valve into the fixed position when a shot pin of the shot pin assembly is inserted into one of the securing means. The method comprises the step of providing at least one securing means around a perimeter of the outlet side adjacent to the outlet section of the angle valve.

Additional objects, features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
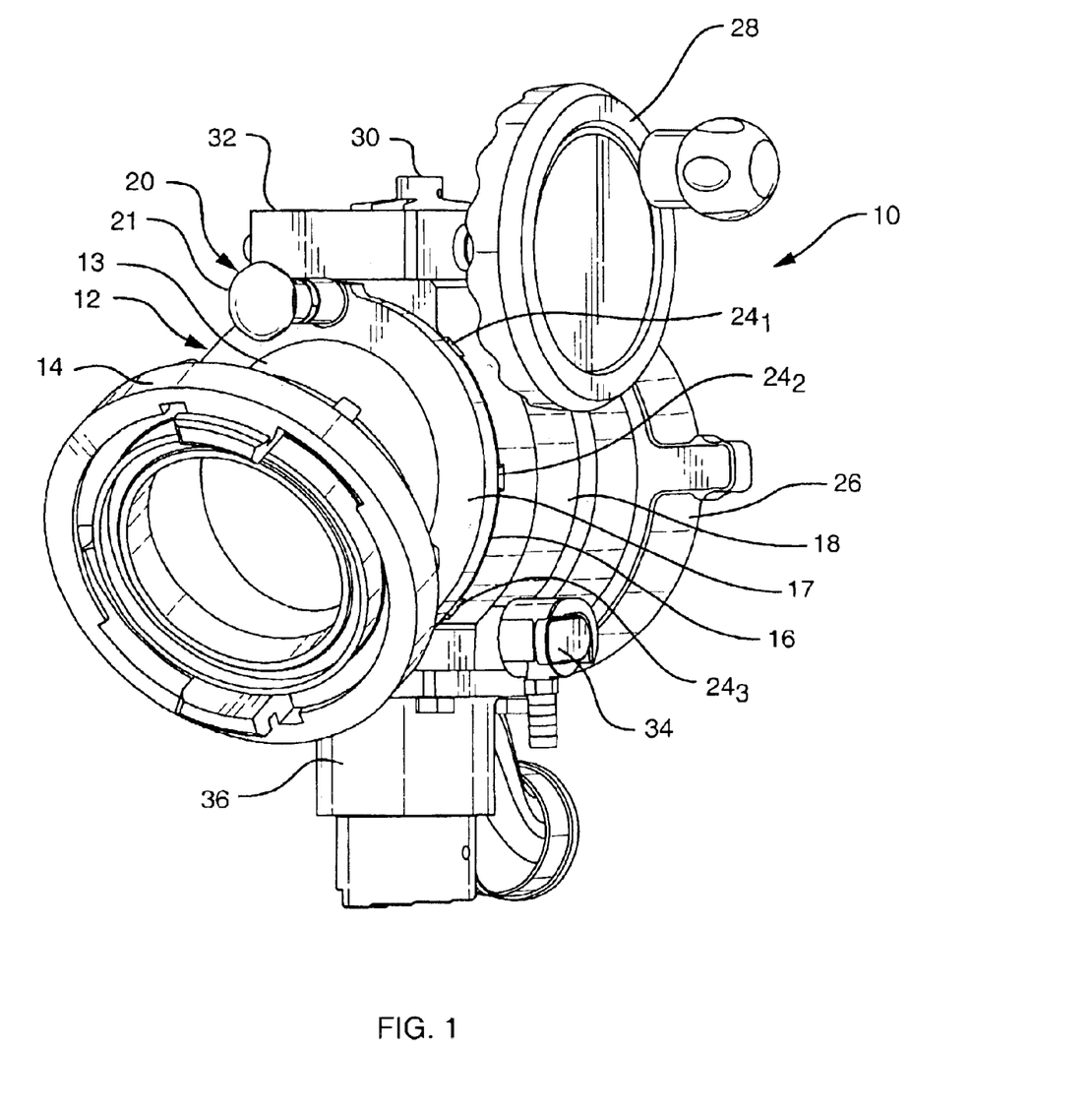
FIG. 1 is a perspective view of a dry sectional gate valve having a swiveling intake elbow according to the invention.

Referring to FIG. 1, a perspective view of a dry sectional gate valve 10 also known as a ball intake valve is shown comprising a swiveling intake elbow 12 attached to one side of a main housing 18 according to the invention. The sectional gate valve 10 further comprises an outlet section 26 attached to an opposite side of the main housing 18, a pressure relief valve 36 attached to a bottom portion of the main housing 18, and an actuator assembly 32 attached to a top portion of the main housing 18 with a valve position indicator 30. A handwheel 28 extends from the actuator assembly 32 to control the position of a sectional gate 50 within the main housing 18. An air vent and drain 34 is mounted on a lower portion of the main housing 18.

Still referring to FIG. 1 the swiveling intake elbow 12 comprises an elbow 13 having a Storz type connector 14 or a fire fighting connector depicted here as an androgynous connector of the type described in U.S. Pat. No. 489,107, issued Jan. 3, 1893, to C.A.G. Storz, entitled "HOSE-PIPE COUPLING", although it could also be a male or female threaded connector or another quick connector type. The Storz type connector 14 is attached to one end of the elbow 13 and the other end of the elbow 13 comprises a swiveling joint 16 for attaching to the inlet side of the main housing 18. The coupling 14 generally connects to a hose (not shown) extending from a water source. The swiveling joint 16 comprises a shot pin assembly 20 attached to a flange 17 of the swiveling joint 16. When the pull knob 21 of the shot pin assembly 20 is retracted or pulled outward away from the main housing 18, the swiveling intake elbow 12 may be rotated and locked into one of eight detent holes spaced around the main housing 18 facing the flange 17 when the pull knob 21 is released. In this embodiment the detent holes are spaced-apart at forty-five degree intervals.

The sectional gate valve 10 is intended for use on the intake manifold of a fire engine. The valve 10 is kept closed while a water supply from a hydrant or another pumper is being connected to the fire engine. This prevents the pump from sucking air through the intake manifold and loosing its prime. Once the supply hose is filled and under pressure, and the air has been vented from the hose, the valve 10 may be opened to conduct liquid from the fluid supply through the sectional gate valve 10 to the fire pumper. The adjustable pressure relief valve 36 mounted on the bottom of the valve main housing 18 opens to relieve any excess pressure that my damage the hose or the pumper.

An embodiment of a sectional gate valve on which the swiveling intake elbow 12 of the present invention may be attached as an improvement is described in U.S. Pat. No. 6,382,247, entitled "DRY SECTIONAL GATE RELIEF VALVE", issued May 7, 2002, to David G. Gundry, and assigned to the present Assignee, and this patent is incorporated herein by reference.

Figure 2A:
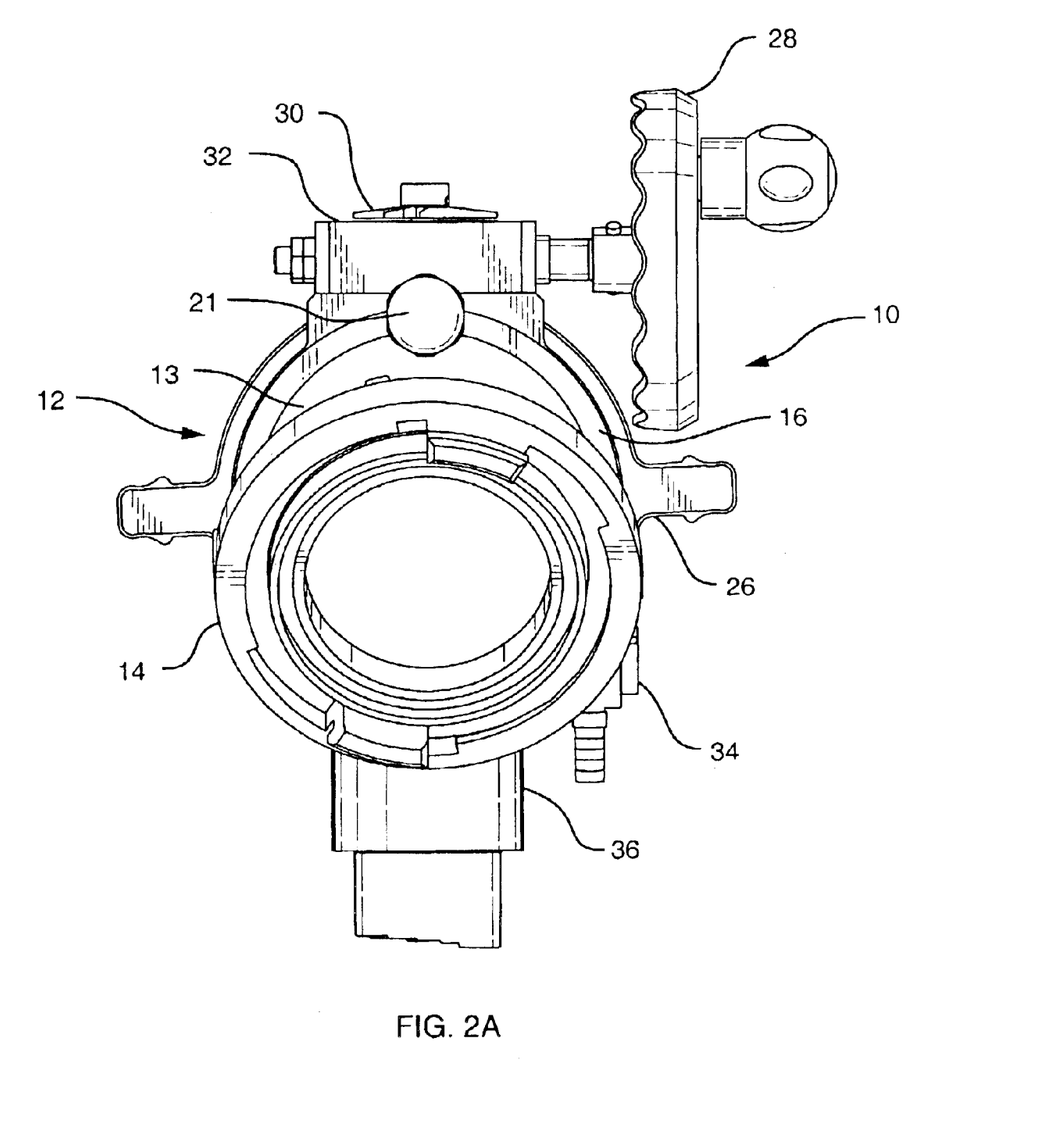
FIG. 2A is a front elevational view of the swiveling intake elbow of the dry sectional gate valve according to the invention with the swiveling intake elbow having a lock pin positioned in a first detent.
Figure 2B:
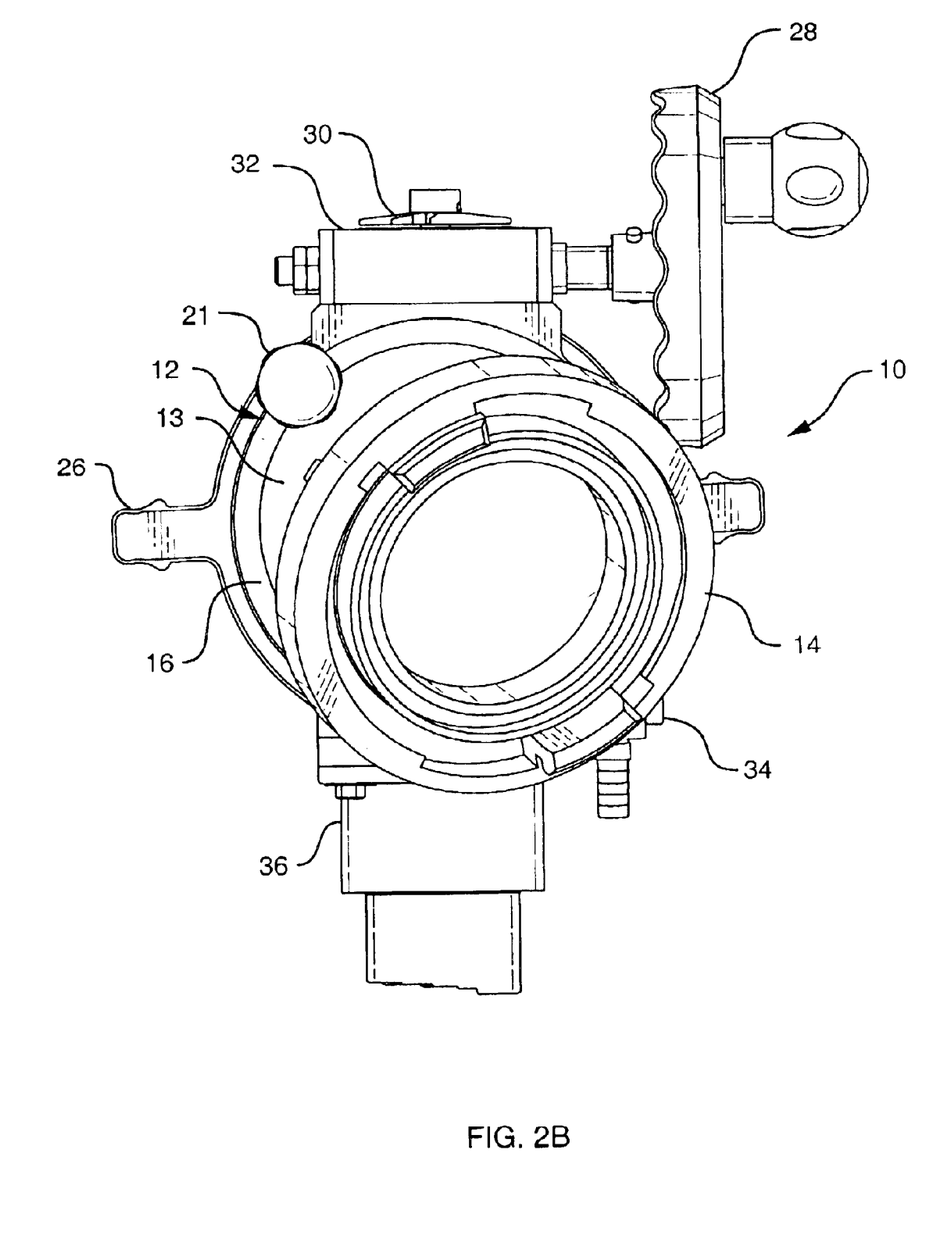
FIG. 2B is a front elevational view of the swiveling intake elbow of the dry sectional gate valve according to the invention with the swiveling intake elbow having a lock pin positioned in a second detent.
Figure 2C:
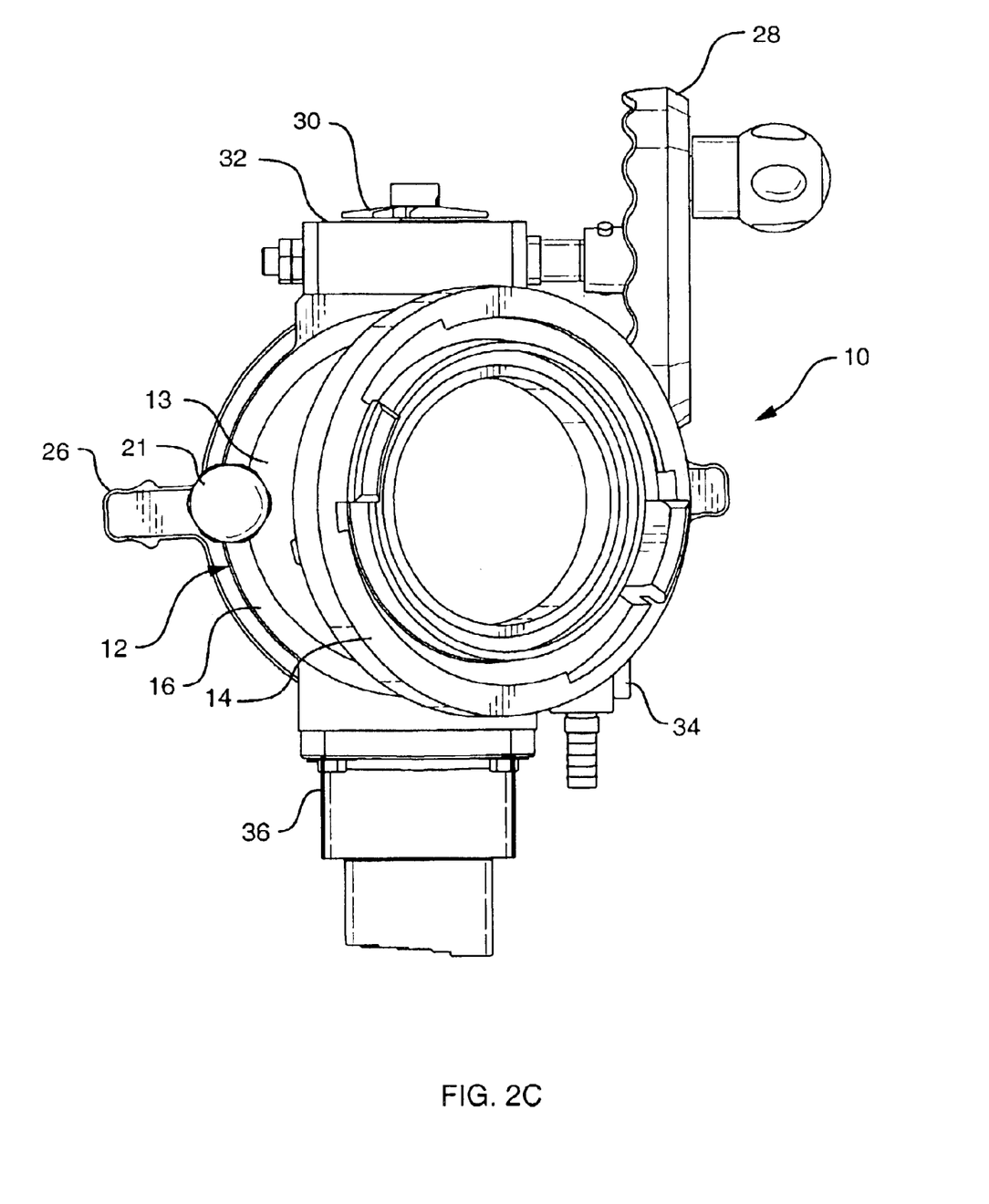
FIG. 2C is a front elevational view of the swiveling intake elbow of the dry sectional gate valve according to the invention with the swiveling intake elbow having a lock pin positioned in a third detent.

Referring to FIG. 2A, FIG. 2B and FIG. 2C, FIG. 2A is a front elevational view of the swiveling intake elbow 12 of the dry sectional gate valve 10 according to the invention and is shown with the swiveling intake elbow 12 selectively locked in a first position by a shot pin assembly 20 having a shot pin 25 inserted into a detent hole 24 (FIG. 3) around the perimeter of the main housing 18. Detent hole 24 may also be formed as a slot if desired.

FIG. 2B is a front elevational view of the swiveling intake elbow 12 of the dry sectional gate valve 10 with the swiveling intake elbow 12 selectively locked in a second position approximately 45 degrees counterclockwise from the position in FIG. 2A by the shot pin assembly 20 having the shot pin 25 inserted into a second detent hole 247 on the perimeter of the main housing 18.

FIG. 2C is a front elevational view of the swiveling intake elbow 12 of the dry sectional gate valve 10 with the swiveling intake elbow 12 selectively locked in a third position approximately 90 degrees counterclockwise from the position in FIG. 2A by the shot pin assembly 20 having the shot pin 25 inserted into a third detent hole 246 on the perimeter of the main housing 18.

When the swiveling intake elbow 12 is first connected to a hose it may be desirable to allow the intake elbow to swivel left or right so that the hose can be positioned without kinks and with the least amount of stress on it. Once the hose assumes a natural position, it may then be desirable to release the pull knob 21 and lock the swiveling intake elbow 12 into a detent hole 24 closest to the natural position of the hose attached to the intake elbow 12.

Figure 3:
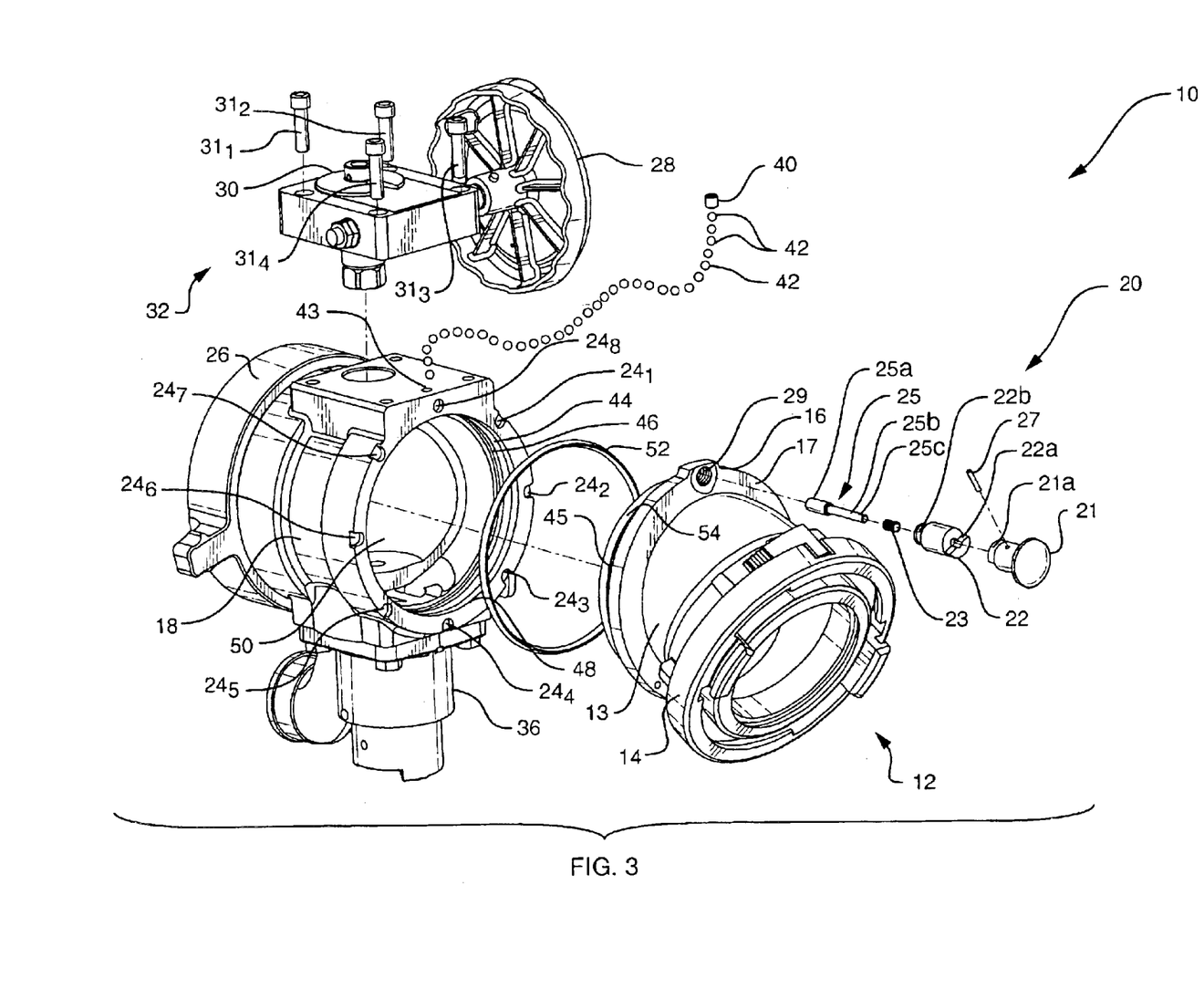
FIG. 3 is an exploded perspective view of a swiveling intake elbow according to the invention which is attached to the sectional gate valve of FIG. 1.

Referring to FIG. 3, an exploded perspective view of the swiveling intake elbow 12 is shown which attaches to the main housing 18 of the sectional gate valve 10. The inside diameter 48 of the intake side of the main housing 18 comprises a female groove 46 for receiving a cup type seal 52. The cup type seal 52 goes into the female groove 46 and seals against the outside diameter of the distal portion 54 of the intake elbow 12. Adjacent to the seal groove 46 is a portion of a bearing ball race partially formed by female groove 44 on the inside diameter 48 of the main housing 18 around its circumference. A female groove 45 is disposed near the distal portion 54 of the intake elbow 12 opposite to the female groove 44, both grooves together forming the bearing ball race, when the swiveling intake elbow 12 is attached to the main housing 18. The groove 45 is formed in the outside diameter of the intake elbow 12 and extends all around the circumference of the distal portion 54. When the distal portion 54 of the intake elbow 12 is inserted into the main housing 18, it is held within the main housing by the bearing balls 42. The bearing balls 42 are loaded into a port 43 in the top of the main housing 18, and a setscrew 40 caps the opening thereby retaining the bearing balls 42 within the grooves 44, 45. Approximately 72 bearing balls 42 are inserted. Loading the balls 42 into the ball race formed by grooves 44, 45 engages the swiveling intake elbow 12 to the main housing 18. The actuator assembly 32 is attached to the top of the main housing 18 by screws $31_1$–$31_4$ after the bearing balls 42 are loaded, and the actuator assembly 32 provides for rotating the sectional gate 50 when the handwheel 28 is turned.

The bearing balls 42 provide for a low friction rolling joint between the intake elbow 12 and the main housing 18 even when under load because they can roll thereby providing the swiveling capability of the intake elbow 12. The grooves 44, 45 forming the ball race are preferably shaped to take an axial load in the direction opposing the forces due to water pressure such that each groove 44, 45 has a section whose shape is conjugate to a portion of the ball. The shape of the ball race formed by grooves 44, 45 is relatively insensitive to minor tolerance variations in manufacturing. Rounded external corners are provided on the grooves 44, 45 forming the race because they hard anodize well and resist damage that a sharp corner may have. While balls are preferred, it is understood that rollers or needles could work equally well. In addition, swivel joints with sliding elements instead of rolling elements could be used, but would require more force to rotate when under pressure given the greater friction.

Figure 4A:
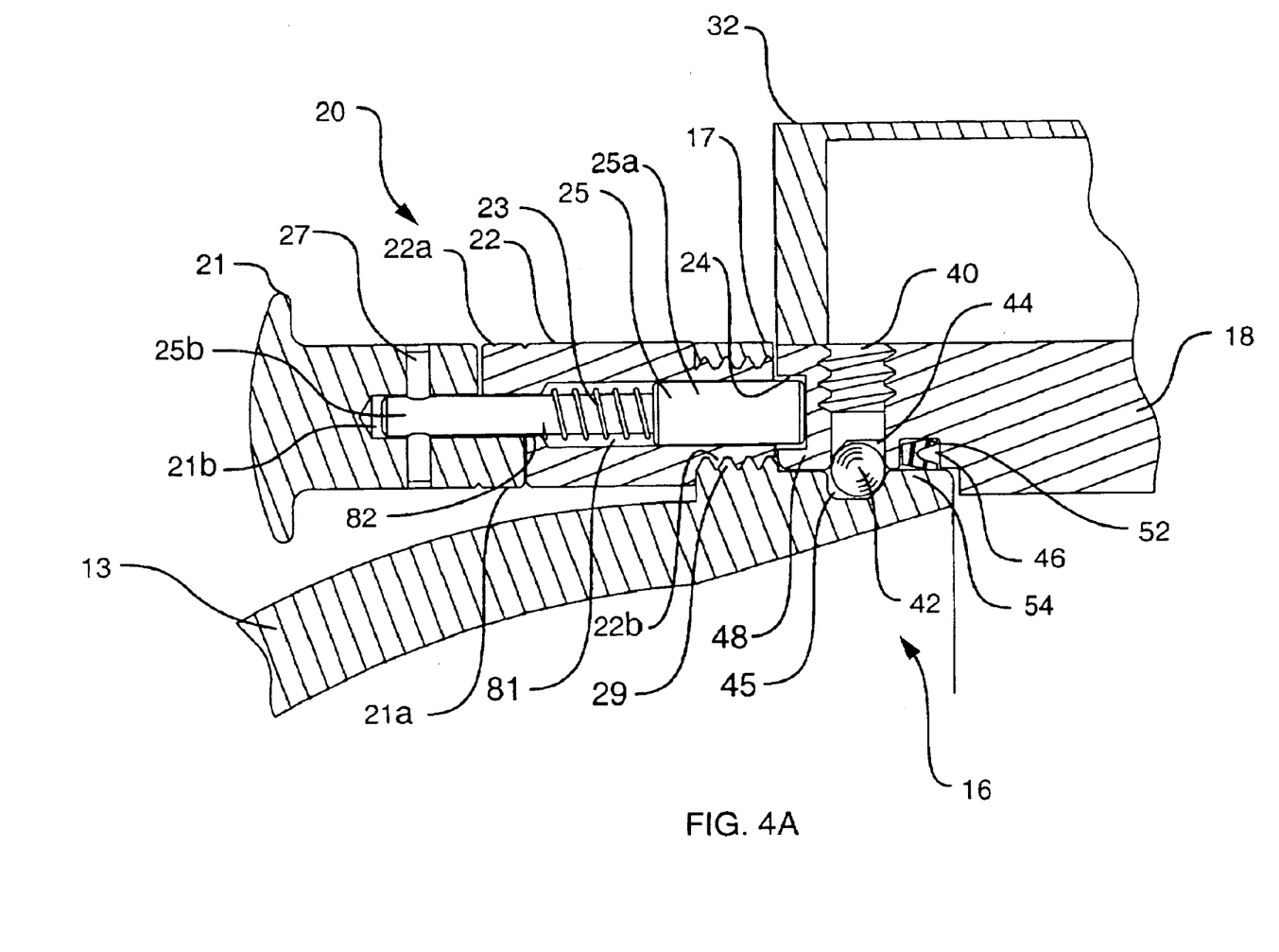
FIG. 4A is a cross-sectional view of a shot pin assembly showing the shot pin engaged into a detent hole in the main housing of the sectional gate valve and showing a bearing ball in a race adjacent to a cup seal.

Still referring to FIG. 3 and also referring to FIG. 4A, FIG. 4A is a cross-sectional view of a shot pin assembly 20. The shot pin assembly 20 comprises a shot pin 25 having a first cylindrical section 25a with a larger diameter than a narrower second cylindrical section 25b. The second cylindrical section 25b receives a coiled spring 23, and they are inserted into a shot pin housing 22. The shot pin housing 22 has a step 22a on an end that mates with a corresponding step 21a on the face of a pull knob 21 when the pull knob 21 is in a mating position. The second cylindrical section 25b with the coiled spring 23 around it is inserted into a cavity 81 within the shot pin housing 22, and the shot pin 25 is pushed into a smaller cavity 82 within the shot pin housing 22. The second cylindrical section 25b is further pushed into a cavity 21b within the pull knob 21, and a spiral pin 27 is pressed into the side of the pull knob 21 and through a hole 25c near the end of the shot pin 25 thereby securing the shot pin 25 within the shot pin housing 22. The shot pin assembly 22 is screwed into a threaded hole 29 in flange 17 of the intake elbow 12 by threads 22b on the end of the shot pin housing 22.

Figure 4B:
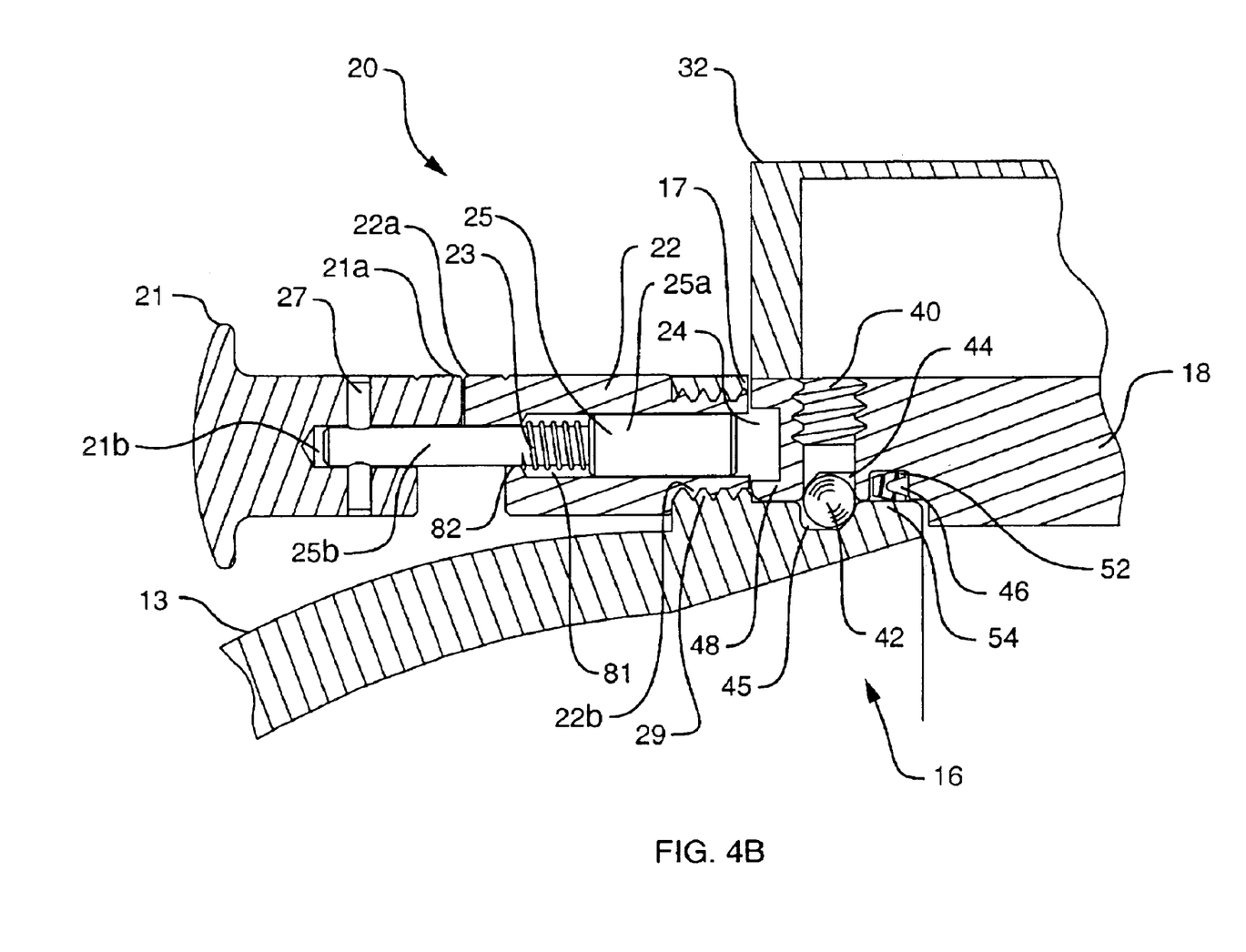
FIG. 4B is a cross-sectional view of the shot pin assembly of FIG. 4A showing a pull knob extended and rotated 180 degrees causing the shot pin to disengage from a detent hole in the main housing.

Referring to FIG. 4B, a cross-sectional view of the shot pin assembly 20 of FIG. 4A shows the pull knob 21 retracted and rotated 180 degrees causing the shot pin 25 to be disengaged from the detent hole 24 in the main housing 18. When the pull knob 21 is retracted and rotated 180 degrees the step portion 21a butts against the step portion 22a of the housing 22 which results in the shot pin 25 being held back from entering any one of the detent holes $24_1$–$24_8$ on the face of the main housing 18.

Referring again to FIG. 3, outlet section 26 is shown attached to an opposite side of the main housing 18. An alternate embodiment is provided by attaching the outlet section 26 to the main housing 18 using a swiveling joint 16 in the same way as inlet section 12 is attached to the main housing 18. This allows swiveling of the sectional gate valve 10 about the outlet section 26 thereby permitting positioning of fire hoses to avoid kinks or obstacles when connected to inlet section 12. Shot pin assembly 20 may be used to fix the position of the sectional gate valve 10 relative to the outlet section 26. The shot pin assembly 20 may be incorporated into either the outlet side of main housing 20 or as part of the outlet section 26. Likewise detent holes 24 may be positioned adjacent to and opposite from the shot pin assembly 20. Fixing the position of sectional gate valve 10 to outlet section 26 allows hand wheel 28 to be easily rotated without undesired swiveling of the sectional gate valve 10 about outlet section 26. Although the alternate embodiment comprises a shot pin assembly 20, one of ordinary skill in the art will recognize that other means for fixing the swiveling to a set position could also be used such as a cam, lever, rotating friction knob, or other locking device. Further, even though the alternate embodiment comprises a dry sectional gate valve 10, one of ordinary skill in the art will recognize that other angle valves such as piston valves or angled gate valves can be made to have the angle valve swivel about an outlet section and that the angle valve can be secured to a fixed position by a shot pin or other locking device.

The parts used to implement the preferred embodiment and the alternate embodiment such as bearing balls 42, cup seal 52 which is made of nitrite rubber Shore A, 70 durometer, set screw 40, roll pin 27, spring 23 and screws 31 are commonly available and known in the art. Except for the cup seal 52, the hardware is made of stainless steel. The elbow 13 and the main housing 18 are made from cast aluminum alloy 356-T6 that is machined and is poly-impregnated, hard anodized and powder painted for maximum corrosion protection; they are manufactured by Task Force Tips, Inc. of Valparaiso, Ind. The shot pin 25 may be embodied by stainless steel bar stock grade 303, annealed. The pull knob 21 may be embodied from aluminum alloy 6262-T9 bar stock and it is hard anodized for corrosion protection and appearance.

While the preferred embodiment is depicted with swiveling intake elbow 12 joined to the dry sectional gate valve 10, one of ordinary skill in the art will recognize that such a swiveling elbow can be joined to other valves such as a ball valve, or a sliding gate valve. It is also understood that locking devices other than shot pins such as levers, cams, keys, tabs, or hydraulic cylinders can accomplish the objects of this invention. Some of these locking devices can lock the swiveling element in any position by the use of friction or engage a series of serrations. Of course the locking device can be located on either the swiveling portion or the stationary portion.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A valve for conducting fluid between a fluid source and a fluid destination comprising:
   a main housing having an adjustable valve;
   means, attached to an outlet section of said main housing, for connecting to said fluid destination;
   means, attached to an inlet section of said main housing, for connecting to said fluid source, said fluid source connecting means including a swiveling intake elbow; and
   means attached to said valve for securing said swiveling intake elbow in a fixed position.

2. The valve as recited in claim 1 wherein said means for securing said swiveling intake elbow in a fixed position comprises a shot pin engagable in at least one detent hole.

3. The valve as recited in claim 2 wherein said valve comprises means for urging said shot pin into engagement with at least one detent hole.

4. The valve as recited in claim 3 wherein said shot pin includes means for maintaining said shot pin out of engagement with said detent hole against the urgings of said urging means.

5. The valve as recited in claim 1 comprises means for controlling the flow of said fluid through said valve.

6. The valve as recited in claim 5 wherein said controlling means moves in response to a rotation of a handwheel.

7. The valve as recited in claim 6 wherein said controlling means comprises a sectional gate positioned adjacent to said outlet section of said main housing.

8. The valve as recited in claim 2 wherein said securing means further comprises:
   a pin recess having a first larger cylindrical recess and a second cylindrical recess;
   a shot pin having a first cylindrical portion with a larger diameter than a second cylindrical portion;
   a coiled spring positioned on said second cylindrical portion of said shot pin, said shot pin and said coiled spring being inserted within said pin recess;
   a pull knob having a second step on an end for mating with a first step of said pin recess, and said second cylindrical portion of said shot pin extends within said pull knob; and means for securing said shot pin to said pull knob.

9. The valve as recited in claim 1 wherein said valve comprises means for relieving pressure within said valve.

10. A sectional gate valve comprising:
   means, located on an outlet section of said valve, for connecting said valve to a fluid destination;
   means, located on an inlet section of said valve, for connecting said valve to a fluid source, said fluid source connecting means comprises a swiveling intake elbow; and
   a sectional gate, mounted inside said valve adjacent to said fluid destination connecting means, for controlling the flow of said fluid through said valve, said valve being dry when said valve is closed, connected to said fluid destination and not connected to said fluid source.

11. The sectional gate valve as recited in claim 10 wherein said valve comprises means for securing said swiveling intake elbow in a fixed position.

12. The sectional gate valve as recited in claim 11 wherein said means for securing said swiveling intake elbow comprises a shot pin for insertion into one of a plurality of spaced-apart holes around said inlet section of said valve.

13. A sectional gate valve comprising:
   a main housing for providing a flow path for a fluid;
   an inlet section of said main housing comprises a swiveling intake elbow for attaching to a hose;
   an outlet section of said main housing comprises a coupling for attaching said sectional gate valve to a pumping source;
   a sectional gate, mounted in said main housing adjacent to said outlet section, for opening and closing said flow path, said main housing being dry when said sectional gate is closed, said outlet section is connected to said pumping source, and said inlet section is not connected to said hose; and
   means, coupled to said sectional gate and mounted on said main housing, for moving said sectional gate in response to a handwheel.

14. The sectional gate valve as recited in claim 13 wherein said main housing comprises spaced-apart holes around the perimeter of said housing adjacent to said inlet section for receiving a shot pin from said swiveling intake elbow to secure said elbow into a fixed position.

15. The sectional gate valve as recited in claim 13 wherein said swiveling intake valve comprises:
   a pin recess having a first larger cylindrical recess and a second cylindrical recess;
   a shot pin having a first cylindrical portion with a larger diameter than a second cylindrical portion;
   a coiled spring positioned on said second cylindrical portion of said shot pin, said shot pin and said coiled spring being inserted within said pin housing;
   a pull knob having a second step on an end for mating with said first step of said pin housing, and said second cylindrical portion of said shot pin extends within said pull knob; and
   means for securing said shot pin to said pull knob.

16. An angle valve for conducting fluid between a fluid source and a fluid destination comprising:
   a main housing having an adjustable valve;
   means, attached to an inlet section of said main housing, for connecting to said fluid source;
   means, attached to an outlet section of said main housing, for connecting to said fluid destination;
   means for swiveling said angle valve about said outlet section; and
   means for securing said swiveling angle valve in a fixed position without the use of a tool.

17. The angle valve as recited in claim 16 wherein said means for securing said swiveling angle valve in a fixed position comprises a shot pin engagable in at least one detent hole.

18. The angle valve as recited in claim 16 wherein said means for securing said swiveling angle valve in a fixed position comprises a friction locking means.

19. The angle valve as recited in claim 16 wherein said means for securing said swiveling angle valve in a fixed position are attached to said angle valve adjacent to said outlet section.

20. The angle valve as recited in claim 16 comprises means for controlling the flow of said fluid through said valve.

21. The angle valve as recited in claim 20 wherein said controlling means moves in response to a rotation of a hand wheel.

22. The angle valve as recited in claim 16 wherein said angle valve comprises means for controlling the flow of said fluid through said angle valve with a piston movable between an open and a closed position.

23. The angle valve as recited in claim 16 wherein said angle valve comprises means for controlling the flow of said fluid through said angle valve with a gate slidable between an open and a closed position.

24. A method of providing a valve to enable attachment to a hose at various angles comprising the steps of:
   providing an outlet section on said valve for connecting said valve to a fluid destination;
   controlling the flow of fluid through said valve with a movable element mounted inside said valve;
   connecting a swiveling intake elbow to an inlet side of said valve, said swiveling intake elbow rotates 360 degrees for ease of attaching or disconnecting said hose; and
   securing said swiveling intake elbow to a fixed position when desired.

25. The method as recited in claim 24 wherein said method comprises the step of providing at least one securing means around a perimeter of said inlet side of said valve adjacent to said swiveling intake elbow.

26. The method as recited in claim 25 wherein said method comprises the step of providing a shot pin assembly on said swiveling intake elbow for securing said swiveling intake elbow into said fixed position when a shot pin of said shot pin assembly is inserted into one of said securing means.

27. The method as recited in claim 24 wherein said method comprises the step of providing at least one securing means around a perimeter of said swiveling intake elbow adjacent to said inlet side of said valve.

28. A method of providing an angle valve to enable attachment to a hose at various angles comprising the steps of:
   providing an angled inlet on said angle valve for connecting said valve to a fluid source;
   controlling a flow of fluid through said angle valve with a movable element mounted inside said angle valve;
   connecting an outlet section to an outlet side of said angle valve, said angle valve swiveling about said outlet section by at least 45 degrees rotation permitting positioning of said hose to a desired angle; and
   securing said angle valve to a fixed position when desired without the use of a tool.

29. The method as recited in claim 28 wherein said method comprises the step of providing at least one securing means around a perimeter of said outlet section of said angle valve adjacent to said outlet side.

30. The method as recited in claim 29 wherein said method comprises the step of providing a shot pin assembly on said swiveling angle valve for securing said swiveling angle valve into said fixed position when a shot pin of said shot pip assembly is inserted into one of said securing means.

31. The method as recited in claim 28 wherein said method comprises the step of providing at least one securing means around a perimeter of said outlet side adjacent to said outlet section of said angle valve.

* * * * *